US008175154B2

(12) United States Patent
Luthra

(10) Patent No.: US 8,175,154 B2
(45) Date of Patent: May 8, 2012

(54) METHOD FOR RESTRUCTURING A GROUP OF PICTURES TO PROVIDE FOR RANDOM ACCESS INTO THE GROUP OF PICTURES

(75) Inventor: Ajay Luthra, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 10/453,211

(22) Filed: Jun. 3, 2003

(65) Prior Publication Data
US 2004/0247188 A1    Dec. 9, 2004

(51) Int. Cl.
*H04N 7/12*    (2006.01)
*H04N 11/02*    (2006.01)
(52) U.S. Cl. .............................. 375/240.12; 375/240.15
(58) Field of Classification Search ........ 375/240.12–240.16; 348/845
See application file for complete search history.

(56) References Cited

U.S. PATENT DOCUMENTS

| 5,602,592 | A | * | 2/1997 | Mori et al. ............... 375/240.12 |
| 5,630,033 | A | * | 5/1997 | Purcell et al. ................. 345/418 |
| 5,822,024 | A | * | 10/1998 | Setogawa et al. ......... 348/425.1 |
| 6,259,736 | B1 | * | 7/2001 | Chujoh et al. ........... 375/240.13 |
| 6,463,101 | B1 |  | 10/2002 | Koto |
| 6,587,506 | B1 | * | 7/2003 | Noridomi et al. ........ 375/240.12 |
| 6,671,323 | B1 | * | 12/2003 | Tahara et al. ............ 375/240.26 |
| 6,731,684 | B1 | * | 5/2004 | Wu ........................... 375/240.12 |
| 7,139,316 | B2 | * | 11/2006 | Yoshinari ................. 375/240.25 |
| 7,266,150 | B2 | * | 9/2007 | Demos ..................... 375/240.15 |
| 2001/0004386 | A1 |  | 6/2001 | Yamamoto |
| 2004/0008786 | A1 | * | 1/2004 | Boyce ...................... 375/240.24 |
| 2004/0028132 | A1 |  | 2/2004 | Kadono et al. |

FOREIGN PATENT DOCUMENTS

JP    8-205174    *  8/1996
WO    94/29999  A1    12/1994

OTHER PUBLICATIONS

Japanese Office Action for Japanese Patent Application No. 2006-515037, mailed Apr. 13, 2010.
EPC Supplementary Search Report, RE: Application #04753853.3-2231 1629416 PCT/US2004017113; May 26, 2011.

(Continued)

*Primary Examiner* — David Czekaj
(74) *Attorney, Agent, or Firm* — Susan R. Payne

(57) ABSTRACT

The present invention is a system and method for restructuring a group of pictures in such a manner as to provide for random access into the group of pictures without substantially degrading the quality of service for the video content. When encoding a current picture, if the current picture is an I picture, the current picture is encoded utilizing intra coding. If the current picture is not an I picture, and is not referenced by future pictures, the current picture is compressed using an arbitrary number of pictures in the past as a reference. If the current picture is not an I picture, and the current picture is not referenced by future pictures, the picture is compressed and the number of reference pictures in the past are limited so that picture prior to the last I picture are not used as a reference. This process continues until the conclusion of the group of pictures.

22 Claims, 3 Drawing Sheets

OTHER PUBLICATIONS

Hannuksela: "Signaling of Clean Random Access Positions", ITU Study Group 16, Video Coding Experts Group; May 10, 2002.

Flierl Markus, et al, "Generalized B Pictures and the Draft H.26L Video Compression Standard", IEEE Transactions on Circuits and Systems for Video Technology, IEEE Service Center; Jan. 1, 2002; pp. 1-11.

Office Action, Korean App. No. 10-2005-7023113 (English Translation), Aug. 19, 2010.

Office Action, Korean App. No. 10-2005-7023113 (Foreign Text), Aug. 19, 2010.

Cited Reference, Korean Patent #0266708 (Foreign Text), Sep. 15, 2000.

* cited by examiner

METHOD FOR RESTRUCTURING A GROUP OF PICTURES TO PROVIDE FOR RANDOM ACCESS INTO THE GROUP OF PICTURES

FIELD OF THE INVENTION

The present invention generally relates to the field of data compression, and more particularly, to a system and apparatus for compressing content to provide for random access into the content.

BACKGROUND OF THE INVENTION

Video compression is an integral component in many of today's most popular devices, such as set-top boxes, digital satellite systems, high definition television, digital versatile disk players, and other video applications. Files containing video content are typically large cumbersome files due to the many details involved in video content. Thus, to make video content manageable, picture streams comprising video content are often compressed into a more manageable size. This process allows these popular technologies utilizing video content to operate at an increased rate of efficiency, resulting in a more pleasant experience for the end-user by allowing microprocessing capacity to be dedicated to quality of service processing instead of maintenance processing.

Video content typically comprises one or more groups of pictures, each of which are a collection of pictures comprised of one or more macroblocks. Each of the pictures in the group of pictures are either I (intra-coded) pictures, B (bi-directional) pictures, or P (predicted) pictures. Furthermore, each individual group of pictures is defined by the collection of pictures beginning at a first I frame and ending at the frame previous to the next I frame.

FIG. 1 is a simplified block diagram illustrating a group of pictures under the MPEG 2 standard. I pictures, shown as pictures 106 and 124 in FIG. 1, are pictures that are compressed utilizing intra-picture coding. Intra-picture coding is a compression method that does not utilize any reference pictures. A reference picture is a picture used as a reference to estimate motion in a picture for compression purposes. Because of this characteristic of I pictures, a group of pictures can easily be directly accessed at any I picture, such as I picture 106, without regard to the content of any previous pictures, such as pictures 102 or 104. Thus, this characteristic of I pictures allows direct access into the group of pictures at any I picture, such as 106 or 124, without any adverse effects on decompression of the video content due to lost past reference pictures.

B pictures and P pictures, on the other hand, do utilize reference pictures in the compression process. B pictures are pictures in an MPEG group of picture sequence that are created by comparing the difference between the current picture and a previous or future picture. On the other hand, P pictures are constructed by analyzing only previous pictures and determining where objects will are in the current pictures. P pictures can predict where static and dynamic parts of the picture are located. This information is then used in the MPEG-2 decoding process to optimize motion transitions.

In MPEG-2, P pictures are coded relative to the nearest preceding I or P picture by using motion prediction processing. Thus, in MPEG-2, P picture 112 may reference I picture 106 via reference path 126. B pictures in MPEG-2 use the closest past I or P picture as a reference, and also use the closest future I or P picture as a reference. Thus, B picture 108 may reference I picture 106 via reference path 128 or P frame 112 via reference path 130.

Even though both B and P pictures utilize reference picture in past, compressing the group of pictures under MPEG-2 does not necessarily prevent random access into the group of pictures. Random access is access into the group of pictures at a random point. Random access is required to support such functions as changing channels and commercial insertion applications. Random access is still possible because at any given point, only one picture behind the current picture could potentially be referenced by a future picture. Thus, in MPEG-2, the location of a P picture with respect to an I picture is irrelevant to the encoder.

However, with the introduction of MPEG-4 Part 10 Advanced Video Coding (AVC)/H.264 (hereinafter referred to as "AVC") comes the utilization of multiple reference pictures for P pictures. Whereas this utilization of multiple reference pictures increases the degree to which the group of pictures can be compressed, problems arise when attempting random access into the group of pictures. For example, if random access is attempted at any I picture, a lost reference picture before I picture may potentially be used as a reference for future pictures after the access point. This lost reference picture is a reference picture that is unavailable when decoding a future picture because of its location temporally behind the access point. Therefore, because of the unavailability of the lost reference picture, the decoder will be unable to decode future pictures properly. Furthermore, future pictures which refer to the lost reference picture may also serve as reference pictures further in the future. Thus, the lost reference picture ultimately creates a chain of pictures that will be improperly decoded, resulting in poor quality of service or loss of viewable video.

For example, referring now to the exemplary AVC group of pictures as shown in FIG. 2, P pictures in AVC may utilize up to 2 past reference pictures. Some groups of pixels in P picture 212 may use I picture 206 as reference via reference path 226, while other groups of pixels in the same P picture 212 may use P picture 200 as reference via reference path 228. If random access is attempted at I picture 206, I picture 206 will be properly decoded because I picture 206 does not reference any other pictures as references due to the nature of I pictures. However, P picture 212 will not be properly decoded because P picture 212 references P picture 200, which is not available due to its location before the random access point 206. Furthermore, future pictures such as 214, 216, and 218 will also be improperly decoded because of the unavailability of P picture 212. Thus, the decoder will improperly decode the entire group of pictures after the access point.

A reference picture, such as P picture 212, that is unavailable during the decoding process because of its location before an access point will hereinafter be referred to as a "lost reference picture." The ultimate effect of lost reference pictures on the decoded video content prohibits features supported by random access, such as changing channels, video editing, and commercial insertion applications. Furthermore, once decoded, the group of pictures results in poor quality of service or loss of viewable video.

Thus, there is a need for an apparatus and method for restructuring a group of pictures to provide for successful random access into the group of pictures. There is also a need for such a method and system providing for random access into the group of pictures that results in minimal distortion to the resulting video content by maintaining a the coding efficiency in the group of pictures.

SUMMARY OF THE INVENTION

The present invention addresses the above-referenced problems by providing an apparatus and method for restructuring a group of pictures in such a manner as to provide for random access into the group of pictures without adversely affecting the video content presentation. When encoding a current picture, if the current picture is an I picture, the current picture is encoded utilizing intra coding. If the current picture is not an I picture, and is not referenced by future pictures, the current picture is compressed using a restricted number of pictures in the past as a reference.

If the current picture is not an I picture, and future pictures reference the current picture, the current picture is compressed and pictures prior to the last I picture are not used as a reference. This process continues until the conclusion of the group of pictures. Thus, the number of past reference pictures is a function of the proximity of the picture to an I picture, wherein the number of reference pictures for some pictures are restricted to enable successful random access into the group of pictures.

DETAILED DESCRIPTION

The following detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing a preferred embodiment of the invention. It should be understood that various changes may be made in the function and arrangement of elements without departing from the spirit and scope of the invention as set forth in the appended claims.

Figure 1:
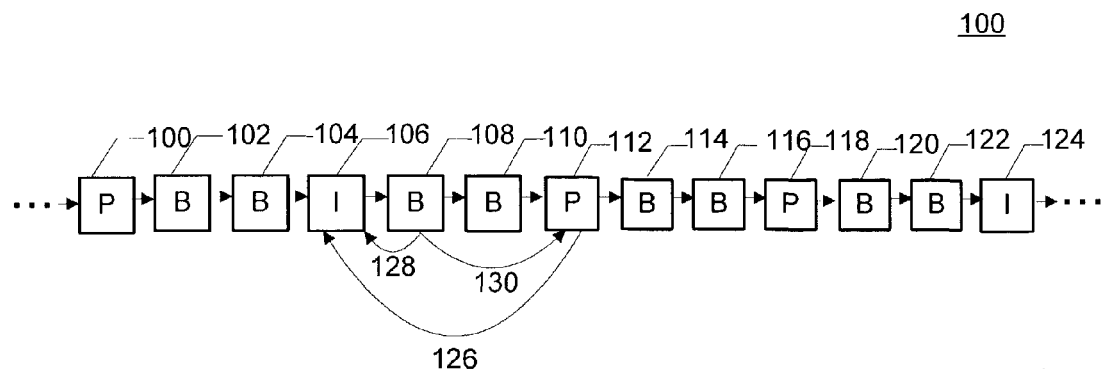
FIG. 1 is a simplified block diagram illustrating a group of pictures under the MPEG 2 standard.
Figure 2:
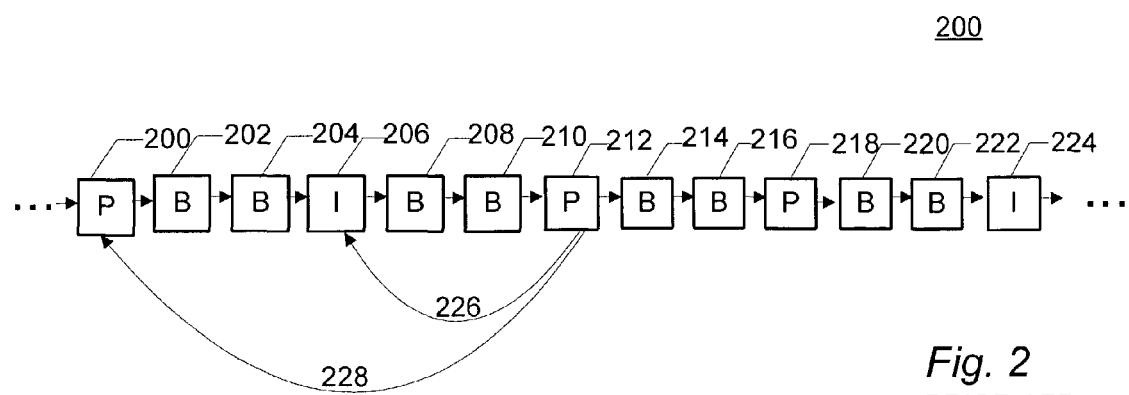
FIG. 2 is a simplified block diagram illustrating a group of pictures under AVC.
Figure 3:
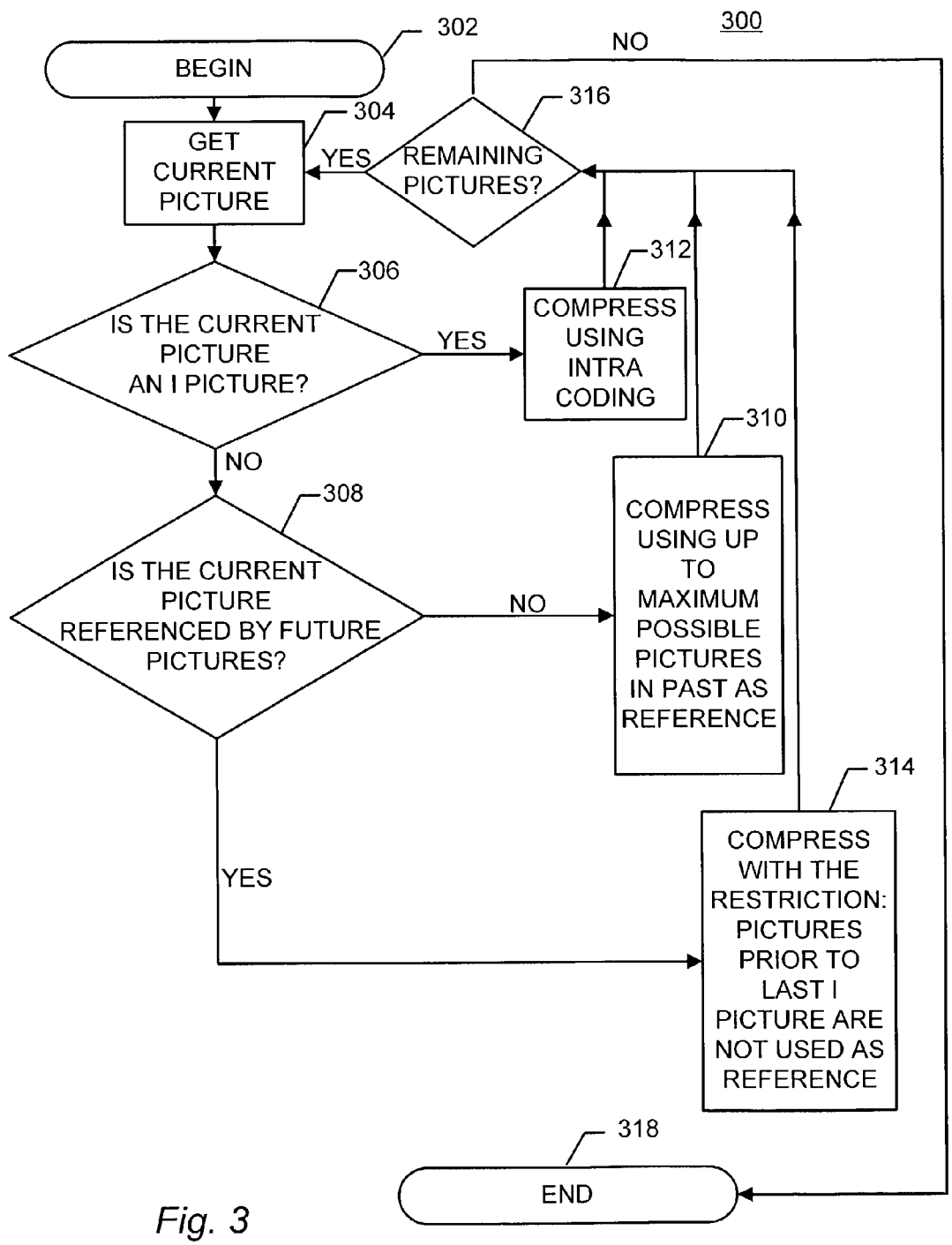
FIG. 3 is a flow diagram illustrating the method of the present invention.

FIG. 3 is a flow diagram illustrating the method of the present invention. Method 300 begins at step 302 and proceeds to the retrieval of a current picture at step 304. At the onset of method 300, the current picture will typically be the temporally first picture in a group of pictures. However, the current picture henceforward for each repetition of method 300 will be the next temporal picture in the group of pictures.

At step 306, the system determines if the current picture is an I picture. If so, the picture is compressed using intra-coding at step 312, without utilizing any pictures in the past or future as reference pictures. Method 300 then proceeds to step 316 and determines if there are any pictures remaining in the group of pictures that follow the current picture. If so, the method retrieves the next picture at step 304 and the method 300 repeats the process.

If at step 306 the current picture is not an I picture, the method proceeds to step 308. If the current picture is not referenced by future pictures, the current picture is compressed without any theoretical restriction on the maximum number of past reference pictures. Physically, the number of reference pictures may be restricted to a limit set by AVC or the storage capacity of the apparatus operating in accordance with the present invention. Method 300 then proceeds to step 316 and determines if there are any pictures remaining in the group of pictures. If so, the method retrieves the next picture in the temporal sequence at step 304.

At step 308, if the present invention determines that the current picture is referenced by future pictures, then method 300 proceeds to step 314. The current picture is then compressed with the restriction that pictures prior to the last I picture are not used as references. This restriction is imposed because if the current picture is used as a reference and refers to other pictures before the access point, then information prior to the access point will be lost. Because this lost information prevents the current picture from being properly decoded, all pictures following the current picture will not be able to be properly decoded. Imposing the restriction that the current picture cannot reference pictures prior to the last I picture prevents this undesirable result.

After step 314, method 300 proceeds to step 316 and determines if there are any pictures remaining in the group of pictures. If so, the method retrieves the next picture at step 304 and repeats the process. If there are not any pictures remaining in the group of pictures at step 316, then the entire group of pictures has been encoded to provide for random access. Method 300 concludes at step 318.

In the event method 300 is applied to a group of pictures including B pictures, the P pictures closer to the I picture at the random access point will involve fewer reference frames. Thus, the coding efficiency these P pictures will have a lower coding efficiency than P pictures appearing later in a group of pictures that utilize a higher number of reference pictures. To counterbalance this result, an alternative group of picture structure should be utilized in the event that B pictures are included in the group of pictures.

Figure 4:
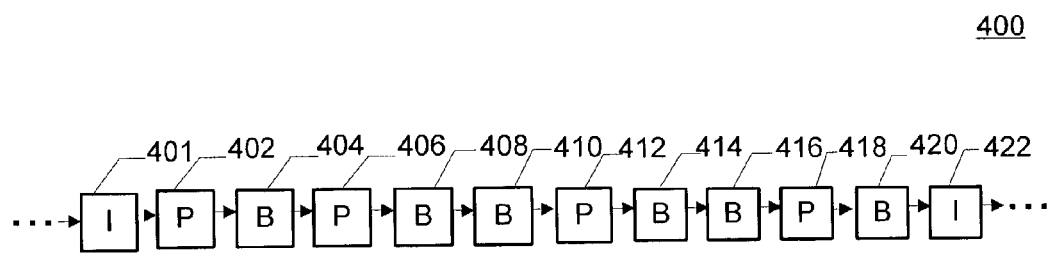
FIG. 4 illustrates the alternative group of picture structure to counterbalance the coding efficiency in a group of pictures in accordance with the present invention.

FIG. 4 illustrates the alternative group of picture structure to counterbalance the coding efficiency in a group of picture in accordance with the present invention. In this alternative group of picture structure 400, the temporal spacing between the first P picture 402 after the I picture 401 is only one picture duration as opposed to 3 picture durations as in known group of picture structures. Thus, this alternative group of picture structure is different from traditional group of picture structure in that there are no B pictures in between the first I picture 401 and the first P picture 402. The first B picture 404 is located after the first P picture 402. There are not any restrictions on the rest of the group of pictures 406-420, until the next I picture 422. After I picture 422, the alternative group of picture structure would require that the next picture (not shown) be a P picture before any B pictures appear in the group of pictures.

The discussion above applies when B pictures are not used references for future pictures. However, in AVC, a class of B pictures called "stored B pictures" may be used as references. A stored B picture is a B picture stored in the memory of the decoder that may be used as a reference for a future picture. Stored B pictures have many of the same characteristics as P pictures, except stored B pictures have bi-motion vectors (two motion vectors per macroblock). In the event stored B pictures are used as references, the same rules described above for P pictures should be followed for the stored B pictures.

Therefore, in summary, the present invention provides an apparatus and method for restructuring a group of pictures utilizing multiple reference pictures to provide for random access into a group of pictures. When encoding a current picture, if the current picture is an I picture, the current picture is encoded utilizing intra coding. If the current picture is not an I picture, and is not referenced by future pictures, the current picture is compressed using an arbitrary number of pictures in the past as a reference. If the current picture is not an I picture, and the current picture is not referenced by future pictures, the picture is compressed and the number of reference pictures in the past are limited so that picture prior to the last I picture are not used as a reference. This process continues until the conclusion of the group of pictures.

What have been described above are preferred embodiments of the present invention. It is, of course, not possible to describe every conceivable combination of methodologies for purposes of describing the present invention. However, one of ordinary skill in the art will recognize that many further combinations, permutations and modifications of the present invention are possible. Therefore, all such possible combinations, permutations and modifications are to be included within the scope of the invention, as defined by the claims below.

What is claimed is:

1. An apparatus for encoding a signal comprising picture information defining a group of pictures, said apparatus comprising:
    an input device for receiving picture information, said picture information comprising I picture information and P picture information;
    an output device for transmitting a signal comprising compressed picture information;
    a processing unit; and,
    a memory, said memory including a program module containing instructions for said processing unit operative to:
       compress I picture information utilizing an intra-coding process; and,
       compress P picture information utilizing past reference picture information;
       wherein selected P picture information references a number of past reference pictures, the number of past reference pictures being based on whether a current picture P is reference by a future picture according to the restriction, such that,
          if the current P picture is reference by a future picture, pictures temporally prior to an I picture which is temporally prior to the current picture are not permitted to be used as reference pictures, and
          if the current P picture is not referenced by a future picture, pictures temporally prior to an I picture which is temporally prior to the current picture are permitted to be used as reference pictures.

2. The apparatus of claim 1, wherein said number of past reference pictures comprises reference picture information temporally prior to I picture information temporally prior to the current P picture.

3. The apparatus of claim 1, wherein said selected P picture information comprises P picture information referenced by picture information temporally prior to the P picture information.

4. The apparatus of claim 1, wherein said processing unit is operative to compress B picture information, said B picture information being compressed using past reference picture information.

5. The apparatus of claim 4, wherein selected B picture information references a number of past reference pictures and future reference pictures.

6. The apparatus of claim 5, wherein said number of past reference pictures comprises reference picture information temporally prior to I picture information temporally prior to the B picture information.

7. An apparatus for decoding a signal, said signal comprising picture information defining a compressed group of pictures, the apparatus comprising:
    an input device for receiving the signal defining the compressed group of pictures, wherein said compressed group of pictures comprises compressed I picture information and compressed P picture information;
    a processing unit; and
    a memory, said memory including a program module containing instructions for said processing unit operative to:
       decode said compressed I picture information into I pictures; and
       decode said compressed P picture information into P pictures utilizing past reference picture information;
       wherein selected P picture information references a number of past reference pictures, the number of past reference pictures being based on whether a current picture P is reference by a future picture according to the restriction, such that,
          if the current P picture is reference by a future picture, pictures temporally prior to an I picture which is temporally prior to the current picture are not permitted to be used as reference pictures, and
          if the current P picture is not referenced by a future picture, pictures temporally prior to an I picture which is temporally prior to the current picture are permitted to be used as reference pictures.

8. The apparatus of claim 7, wherein said selected compressed P picture information comprises compressed P picture information referenced by picture information temporally prior to the compressed P picture information.

9. The apparatus of claim 7, wherein said number of past reference pictures comprises reference picture information temporally prior to the compressed I picture information temporally prior to the current P picture.

10. The apparatus of claim 7, wherein said processing unit is operative to decode compressed B picture information, said compressed B picture information decoded using past reference picture information and future reference pictures.

11. The apparatus of claim 10, wherein said number of past reference pictures comprises past reference picture information temporally prior to I picture information temporally prior to the B picture information.

12. A method of encoding a signal comprising picture information defining a group of pictures, said method comprising:
    receiving picture information comprising I picture information and P picture information;
    encoding said I picture information by utilizing an intra-coding process;
    encoding said P picture information utilizing past reference picture information;
       wherein selected P picture information references a number of past reference pictures, the number of past reference pictures being based on whether a current picture P is reference by a future picture according to the restriction, such that,
          if the current P picture is reference by a future picture, pictures temporally prior to an I picture which is temporally prior to the current picture are not permitted to be used as reference pictures, and
          if the current P picture is not referenced by a future picture, pictures temporally prior to an I picture which is temporally prior to the current picture are permitted to be used as reference pictures.

13. The apparatus of claim 12, wherein said number of past reference pictures comprises reference picture information temporally prior to the I picture information temporally prior to the current P picture.

14. The apparatus of claim 12, wherein said selected P picture information comprises P picture information referenced by picture information temporally prior to the P picture information.

15. The apparatus of claim 12, wherein said picture information further comprises B picture information, said B picture information encoded using past reference picture information.

16. The apparatus of claim 15, wherein selected B picture information references a number of past reference pictures and future reference pictures.

17. The apparatus of claim 16, wherein said number of past reference pictures comprises past reference picture information temporally prior to I picture information in closest proximity to the B picture information.

18. A method of decoding a signal comprising picture information defining a compressed group of pictures, said method comprising:

receiving picture information comprising compressed I picture information and compressed P picture information;

decoding said compressed I picture information into I picture information;

decoding said compressed P pictures into P picture information utilizing past reference picture information;

wherein selected P picture information references a number of past reference pictures, the number of past reference pictures being based on whether a current picture P is reference by a future picture according to the restriction, such that, if the current P picture is reference by a future picture, pictures temporally prior to an I picture which is temporally prior to the current picture are not permitted to be used as reference pictures, and if the current P picture is not referenced by a future picture, pictures temporally prior to an I picture which is temporally prior to the current picture are permitted to be used as reference pictures.

19. The apparatus of claim 18, wherein said selected P picture information comprises P picture information referenced by picture information temporally prior to the current P picture.

20. The apparatus of claim 18, wherein said number of past reference pictures comprises reference picture information temporally prior to the compressed I picture information temporally prior to the current P picture.

21. The apparatus of claim 18, wherein receiving said picture information further comprises receiving compressed B picture information and future reference pictures.

22. The apparatus of claim 21, wherein said number of past reference pictures comprises past reference picture information temporally prior to I picture information temporally prior to the B picture information.

* * * * *